United States Patent [19]

Kast

[11] Patent Number: 4,714,585
[45] Date of Patent: Dec. 22, 1987

[54] INTERLOCKING EGG-CRATE TYPE GRID ASSEMBLY

[75] Inventor: Steven J. Kast, Niskayuna, N.Y.

[73] Assignee: The United States of America as represented by the United States Department of Energy, Washington, D.C.

[21] Appl. No.: 712,056

[22] Filed: Mar. 15, 1985

[51] Int. Cl.[4] .............................................. G21C 3/34
[52] U.S. Cl. .................................. 376/442; 376/462
[58] Field of Search ............... 376/441, 442, 462, 438

[56] References Cited

U.S. PATENT DOCUMENTS

| | | | |
|---|---|---|---|
| 3,423,287 | 1/1969 | Anthony et al. | 376/442 |
| 3,463,703 | 8/1969 | Crandall | 376/442 |
| 3,679,547 | 7/1972 | Warberg | 376/442 |
| 3,833,471 | 9/1974 | Chetter | 376/442 |
| 3,920,515 | 11/1975 | Ferrari et al. | 376/442 |
| 3,933,583 | 1/1976 | Jabsen | 376/446 X |
| 4,021,300 | 5/1977 | Marshall et al. | 376/442 X |
| 4,492,844 | 1/1985 | Kobuck et al. | 376/442 X |
| 4,547,335 | 10/1985 | Downs et al. | 376/442 |

FOREIGN PATENT DOCUMENTS

| | | | |
|---|---|---|---|
| 1386424 | 3/1975 | United Kingdom | 376/442 |
| 2010567 | 6/1979 | United Kingdom | 376/442 |

Primary Examiner—John F. Terapane
Assistant Examiner—John S. Maples
Attorney, Agent, or Firm—William W. Randolph; Judson R. Hightower; Richard E. Constant

[57] ABSTRACT

Disclosed is an interlocking egg-crate hexagonal grid for supporting a nuclear fuel pin in a hexagonal array. The grid is formed from strips bent at an angle of about 120° at each vertex. Over some faces of each hexagonal cell the strips are coplanar but are arranged, by stacking and interlocking, to avoid any double thickness of metal in that plane. Springs and dimples are formed in the faces of each cell to hold the fuel pin substantially centered.

12 Claims, 11 Drawing Figures

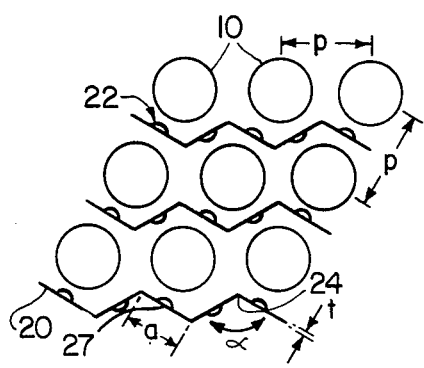
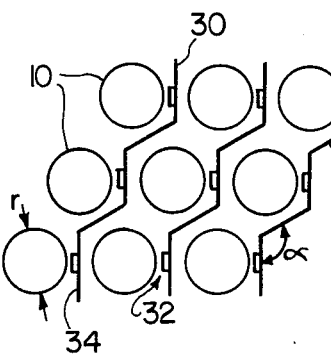
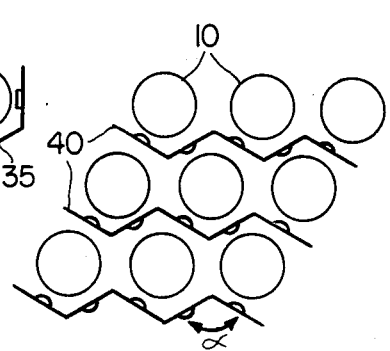
FIG. 1A  FIG. 1B  FIG. 1C
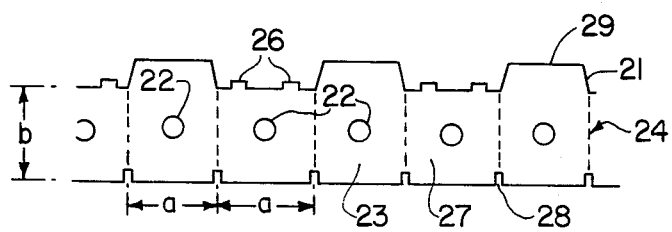
FIG. 2
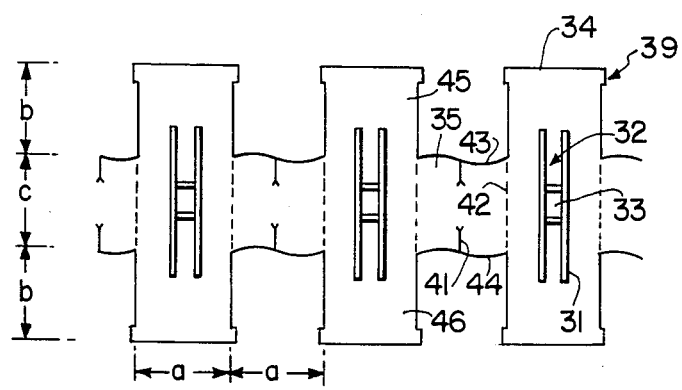
FIG. 3
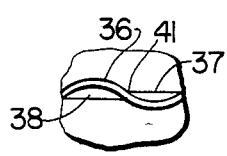
FIG. 3A

ND EGG-CRATE TYPE GRID ASSEMBLY

The United States Government has rights in this invention pursuant to Contract No. EY-76-C-120052 between the U.S. Department of Energy and the General Electric Company.

FIELD OF THE INVENTION

The present invention relates to grid structures for nuclear reactor fuel assemblies and more particularly to an interlocking egg-crate grid assembly for spacing and supporting fuel pins in bundles or assemblies in the core of a nuclear reactor.

BACKGROUND AND PRIOR ART

A nuclear chain reaction is obtained by bombarding fissionable fuel material with neutrons from a source of neutrons to split some of the atomic nuclei of the fuel into fragments, thereby releasing useful energy in the form of heat and other neutrons for bombarding other nuclei, and so on, ad infinitum, so long as each fuel nucleus undergoing fragmentation produces a minimum of one neutron on the average which in turn fragments another fuel nucleus. The process, called fission, depends for its continuity on an adequate supply of neutrons and fuel. To control the reaction, devices having large neutron absorption cross sections are generally utilized in conjunction with a moderating material for slowing down neutrons so that they possess the desired energy spectrum. The fuel, neutron absorbing material and moderator, together with associated structural components make up the core of the reactor, through which a heat transfer fluid is circulated to remove heat generated by the fission process.

The present invention is concerned with a structural component of the core, in that it is concerned with apparatus for spacing and supporting nuclear fuel bearing members in an upright position within the core of a nuclear reactor.

To achieve optimum power distribution across the core, consideration must be given to the shape and distribution of the fuel bearing members. Since the heat generated by the fuel is more efficiently dissipated from the area surrounding the fuel when the fuel bearing member has a high ratio of surface area to volume, modern day reactors utilize a plurality of slender elongated fuel members or rods known as fuel pins which are each made of a length of fuel material enclosed in a relatively thin-walled circular tube of cladding material. A number of fuel pins are clustered together in a composite assembly known as a fuel assembly or bundle, whereas a plurality of fuel bundles make up a core. Due to their slender construction, whatever means is used to space and position the fuel pins relative to one another must have good mechanical stability as well as the ability to compensate for the slight differences in cross-sectional dimension of the individual fuel pins due to manufacturing tolerances. In addition, to expose the greatest possible surface area of a given pin to coolant flow, contact between the supporting structure and the pin, and obstructions to coolant flow around the pins, should be minimized.

Since fuel pins are quite long compared to their diameters, one or more spacer grids are provided to prevent bowing of the fuel pins due to thermal, mechanical and hydraulic influences, and to maintain them in the desired array.

Spacer grids are subject to conflicting design objectives. The grid must have sufficient strength to limit fuel rod bowing and vibration and to resist severe thermal and hydraulic forces. It must provide sufficient contact area with the fuel rods to minimize local fretting damage to the fuel rod cladding at the points of contact. It must accommodate fuel rod swelling and it must allow fuel rod insertion without damage. The grid should require, on the other hand, a minimum of material to minimize parasitic neutron absorption. It should be designed to minimize restriction of coolant flow through the channel and it should be adapted to fabrication from low-neutron absorption materials. In addition, it should be structurally sound without dependence upon critical fabrication processes.

The grids of the present invention may be used with nuclear reactor fuel bundles such as are used in pressurized water reactors (PWRs), boiling water reactors (BWRs) or light water breeder reactors (LWBRs), although it is especially useful for LWBRs. In such bundles, fissionable fuel is disposed within the elongated fuel pins which are mounted in a parallel array, generally between a pair of end plates. When the bundle is in service in a nuclear reactor, water or other coolant passes along the outer surface of the fuel pins, receiving heat generated therein. In order to permit uniform heat removal and to avoid overheating of the rods, it is necessary that they be accurately spaced apart laterally. Maintaining the spacing of the elongated rods in such a closely spaced array under conditions in which vibration naturally occurs, requires a carefully designed spacer. Fuel pin spacers are typically made of some type of spring steel or zircaloy strips interlocked at rights angles to form an egg crate. The egg crates are typically spot welded at the strip intersection to provide structural connections. Such spacers have been the subject of many prior art patents as exemplified below.

U.S. Pat. No. 3,423,287 to Anthony et al describes a spacer for providing lateral support and spacing for fuel pins in elongate fuel bundles such as are commonly used in PWR cores.

U.S. Pat. No. 3,463,703 to Crandall describes a spacer grid consisting of parallel strips of jointed "V's" transverse of and between the fuel pins, each V containing a fuel pin which is supported by protuberances extending from the side of the V.

U.S. Pat. No. 3,679,547 to Warberg describes a nuclear reactor fuel assembly having spacer support grids formed from grid strips which are interconnected at right angles to form a grid cell for supporting each fuel pin by means of four resilient supporting points acting in opposing pairs.

U.S. Pat. No. 3,920,515 to Ferrari et al describes a fuel assembly spacer grid comprised of interwoven metallic straps formed into an egg-crate grid having opening for receiving fuel pins. Spring and dimple support structures are provided at the fuel pin-spacer grid interface.

U.S. Pat. No. 3,933,583 to Jabsen also describes an egg-crate grid structure formed of inter-connected metal strips for supporting fuel pins in a nuclear reactor core.

The above-referenced patents all relate to grid assemblies for either BWR or PWR cores. The physics requirements for a LWBR demands that the fuel pins be more closely spaced together than the fuel pins of a PWR or BWR. Therefore, the generally square grid lattices discussed above are not as efficient or practical as a more tightly spaced lattice arrangement. Note, however, the U.S. Pat. No. 3,679,547 discussed above was proposed for use with a breeder reactor utilizing liquid sodium or water as a coolant.

A hexagonal shaped grid structure (like a honeycomb) has been proposed for use with LWBRs. Hexagonal shapes, however, cannot conveniently be formed into interlocking strips such as in grid structures described above.

In U.S. Pat. No. 4,021,300 to Marshall et al a fuel assembly spacer grid is proposed wherein the grids are attached to a hexagonal channel (as opposed to grid lattice). The fuel pins are supported by a grid spacer formed from a staggered pattern of layers of two "line-of-sight" wave beams retained within the hexagonal channel. The grid thus formed is not of the interlocking variety and could not be applied in a closely-spaced hexagonal pin lattice which does not have an adequate "line-of-sight" between the rows of fuel pins. While the benefits in terms of ease of fabrication and construction of spacer grids formed from interlocking strips is well known, to date, no configuration has been devised for forming a spacer grid, having a hexagonal fuel pin array, from interlocking strips.

SUMMARY OF THE INVENTION

It is therefore an object of the present invention to provide an improved spacer grid design.

It is a further object of the present invention to provide an improved spacer grid design comprised of interlocking strips to reduce fabrication logistics.

It is a further object of the present invention to provide an improved spacer grid design in which the use of pins at the vertices of the interlocking strips is avoided.

It is a still further object of the present invention to provide an improved fuel assembly wherein the use of double thickness of metal strips along some of the faces of the fuel assembly is avoided.

It is a still further object of the present invention to provide an improved interlocking grid which will retain its structural integrity even if some of its welds fail.

It is a still further object of the present invention to provide a fuel pin lattice which is rigid against distortion and which is dimensionally stable over a large lattice array.

To achieve the foregoing and other objectives and in accordance with the purpose of the present invention as described herein, the invention may comprise a grid assembly made from three interlocking grid strips which when assembled together form an array of hexagonal grid cells to allow for a tight fuel pin lattice. The strips are formed in a zig-zag fashion out of a series of segments angled with respect to each other. Two of the strips are preferably formed with dimples on the face of each segment, the third strip being formed with a resilient contact, preferably in the form of an integral spring, formed in every alternate segments. The alternate faces of the third strip without springs are preferably formed with S-shaped slots in them to receive complementary tabs positioned on the other two strips for interlocking the strips to form the egg-crate type grid structure.

Additional slots and tabs may preferably be formed on the strips to provide a simple and efficient interlocking structure.

The grid is preferably bounded by a peripheral strip at which the other grid strips preferably terminate in a slot and tab arrangement.

Each cell of the spacer grid thus formed preferably contacts the fuel pin with a resilient contact opposed by two pairs of rigid dimples thus providing firm, stable triangular support structure which will allow the fuel pins to move axially as required but will support the pins against mechanical and hydraulic forces.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the present invention, illustrate the preferred embodiment of the present invention and together with the description, serve to explain the principles of the present invention. Similar elements in the various drawings are denoted with the same reference numeral. In the drawings:

FIG. 1A–1C are top, fragmentary views depicting the various layers of the interlocking hexagonal grid;

FIG. 2 is a plan view of a stamped strip of a layer of FIGS. 1A or 1C;

FIG. 3 is a plan view of a stamped strip of a layer of FIG. 1B;

FIG. 3A is a top, fragmentary view of a slotted "S" portion of the strip of FIG. 3;

DETAILED DESCRIPTION OF THE INVENTION

Figure 4:
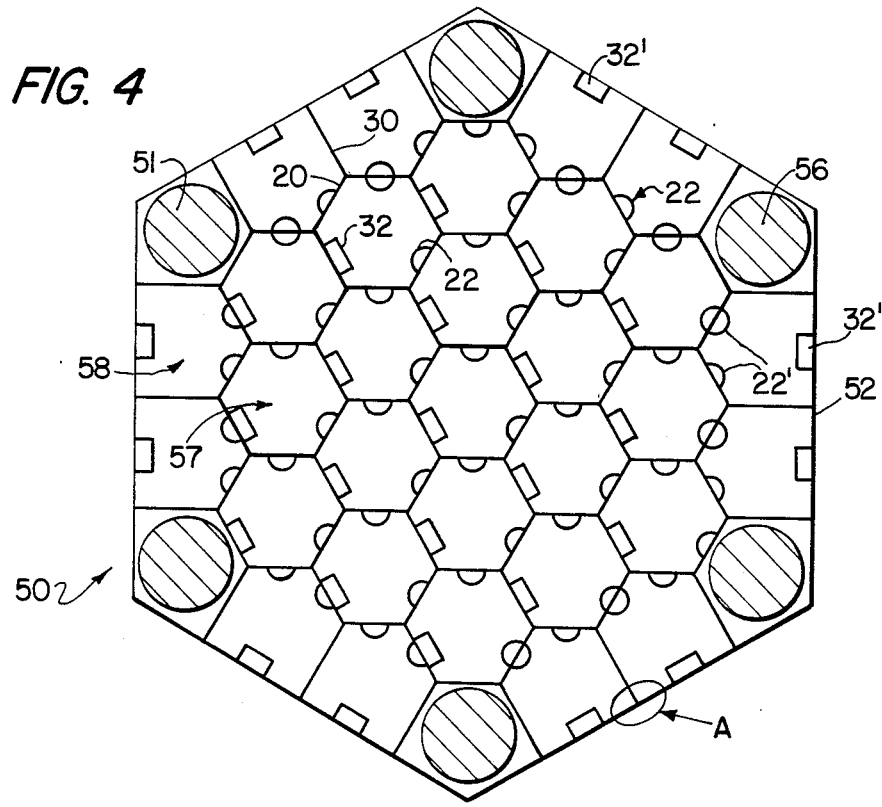
FIG. 4 is a top view of a schematic diagram depicting an exemplary 37 cell hexagonal grid compound of the strips of FIGS. 1A–1C assembled.

Reference will now be made in detail to the present preferred embodiment of the invention, an example of which is illustrated in the accompanying drawings. Turning first to FIGS. 1A–1C, there is depicted an array of fuel pins 10. The pins 10 are spaced and supported by a hexagonal egg-crate interlocking grid formed from the strips 20, 30 and 40. The pins 10 are positioned in a closely packed triangular array having a pitch p between the axis of adjacent pins. In the array depicted, the triangle formed by three adjacent pins 10 forms an equilateral triangle so that the pins may be packed into a tight array. The egg-crate grid of the present invention is formed from interlocking strips 20, 30 and 40 oriented as shown in FIGS. 1A–1C. Each strip is preferably formed "zig-zag" pattern having faces of approximately equal length and bends of approximately 120°. As will be understood with respect to the description of FIG. 5 below, the strips which form the first and third layers (FIGS. 1A and 1C) are similar in configuration but with their orientations reversed.

Turning first to FIG. 1A, there are depicted several strips which together form a part of the first layer of the grid. Each strip 20 has a thickness t which is as thin as possible to reduce the amount of parasitic material in the core but which has sufficient strength and rigidity to properly space and support the fuel pins. Each face of the strip 20 has a face 27, the length of which is determined by the pitch p of the fuel pin lattice. Adjacent faces of the strip are formed with an interior angle of approximately 120° therebetween. On each face 27 of the strip 20 is formed a dimple 22 which is a relatively rigid protuberance (with respect to the springs 32) which forms a part of the support for the fuel pins. The third layer of strips, FIG. 1C, are formed in a manner similar to the strips of FIG. 1A but as assembled will be of reverse orientation as described below with respect to FIG. 5. The second or middle layer, depicted in FIG. 1B, is also formed of strips comprised of segments bent at an angle of approximately 120° to each other. Each alternate face 34 of the strips 30 has a spring 32 formed in it. Intervening alternate faces of strip 30 have no spring and are used as the site to interlock the strips as described below.

FIG. 2 depicts a detail of a strip of FIGS. 1A or 1C. For convenience, the strip will be referred to as strip 20, but it should be understood such reference and the following description is also applicable to the strips 40 of FIG. 1C. Each strip is comprised of alternating segments having faces 23 and 27. Faces 27 have dimples 22 stamped or otherwise imparted onto them and are generally rectangular in shape. A pair of tabs 26 are provided to engage with the slots 36 as described hereinbelow. Faces 23 also have dimples 22 stamped or otherwise formed on them. The strips preferably are provided with short vanes 29 having beveled sides in order to guide the interlocking strips 30 into correct position upon assembly.

Slots 28 are formed in the strip 20 along with vertices 24 of the bends. These slots are dimensioned to accommodate complementary tabs in the strips 30 as detailed below with respect to FIG. 3.

Turning now to FIG. 3 there is depicted an exemplary strip from the grid layer of FIG. 1B.

Each strip 30 preferably is comprised of two types of faces, 34 and 35, formed by stamping or otherwise at an angle of approximately 120° to each other about the vertices 42. The faces 34 and 35 are preferably of approximately the same length, a, as the faces 23 and 27 of strip 20 and are a function of the pitch, p, of the fuel pin lattice. The height of the face 35, c, is not crucial as long as it is properly dimensioned to accommodate the interleaving of the various strips and provides the necessary mechanical strength and rigidity. The amount of material in the grid should, of course, be minimized to reduce parasitic neutron absorption.

The portion 35 of the strip is formed with its upper and lower edges 43 and 44 in the shape of a bent "S", 36, (see FIG. 3A) to form slots 37 and 38 which, during assembly, accommodate tabs 26 on strips 20 and tabs 66 on strips 40 as detailed below.

The faces 34 of the strip 30 have portions 45 and 46 extending respectively above and below the face 35. The portions 45 and 46 have a height, b, approximately equal to the height of a section 27 of the strip 20. Pressed, stamped or otherwise formed in the face 34 is a spring 32 which may be formed between two slits 31 cut in the face 34 of the strip 30. The spring may have a nipple or detent 33 formed for making contact with the fuel pin. As will be apparent to the artisan, other spring geometries may be used, such as cantilevered or snap-on leaf springs, the above-described integral spring being illustrative only. Each corner of the face 34 has a tab 39 which cooperates (as described hereinbelow) with the slots 28 in the strips 20 during assembly.

Figure 4A:
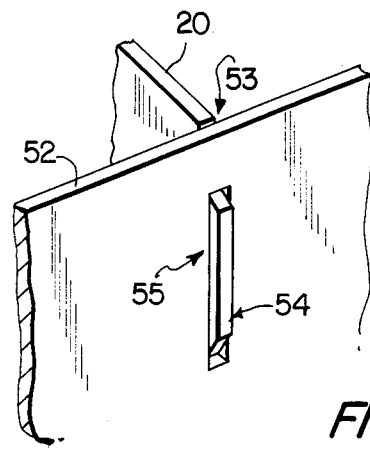
FIG. 4A is a fragmentary perspective view depicting the attachment of a grid strip to the peripheral boundary strip.

Turning now to FIGS. 4 and 4A, the assembly of the strips of FIGS. 1A-1C and the peripheral boundary strip will be described.

During assembly the tabs 39 from the strips 30 are inserted into the slots 28 of the strips 20 (and 40). At the same time, the tabs 26 are guided onto opposite sides of the bent "S" slot 36. As can be seen from FIGS. 6A and 6B, at this point of the assembly, face 27 of strip 20 becomes coplanar with the face 35 of strip 30.

Each cell 57 formed during the assembly supports the fuel pins 10 within the cell by means of springs 32 holding the pins 10 against the dimples 22 with sufficient force to allow the rods to expand and contract during power excursions of the reactor while restraining the rod against mechanical and hydraulic forces acting upon it.

The peripheral row of cells 58 may preferably be formed in the shape of pentagons as opposed to the hexagonal shape of cells 57. The peripheral boundary strip 52 is formed with spring members 32' along it to support the pin against the relatively rigid dimples 22'. For connecting the strips at their ends, there are provided tabs means 54 or the like that fit into slots 55 in the peripheral boundary strip 52. During assembly, the strips may be spot welded or otherwise metallurgically or mechanically bonded at the intersection between the shoulder 53 of the strip (20, 30, 40) and the peripheral strip 52. The tabs 54 may also be fusion welded or otherwise bonded in the slot 55 during final assembly to insure a strong finished assembly.

Structural posts 56 which support the fuel bundle are preferably provided at each of the six corners of the hexagonal fuel bundle. It should be readily appreciated, however, that other skeletal support arrangements can be used to axially space the grids from each other along the height of the fuel bundle and to provide support for the fuel bundle.

Figure 5:
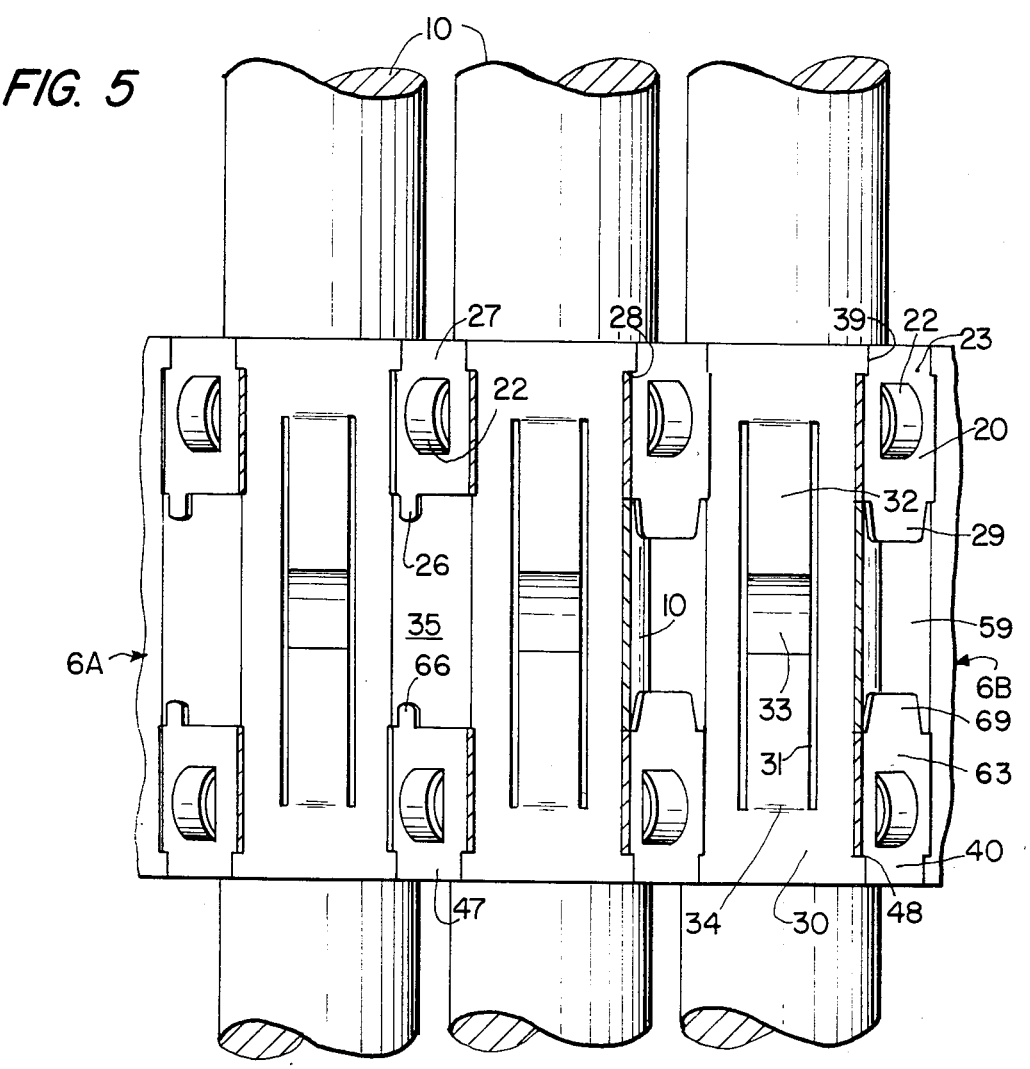
FIG. 5 is a front, fragmentary elevation depicting the interlocking egg-crate grids holding fuel pins.

Turning now to FIG. 5 there is a front elevation view of interlocking egg-crate grids supporting fuel pins 10. The upper and lower grid straps 20 and 40 respectively, having dimples 22 for contacting the fuel rods are shown on the faces 23 and 63 of the upper and lower grid straps respectively. On the right side of FIG. 5, the grid strap portions 23 and 63 with the scalloped edges 29 and 69 can be viewed. On the left side of FIG. 5, the faces 27 and 47 of the upper and lower grid straps can be seen with the tabs 26 and 66 clipped onto the "s" slot 36 of face 35 of grid strap 30. Faces 27 and 47 of grid straps also carry dimples 22 for contacting fuel rods 10. The tabs 39 of grid strip 30 fit in interlocking engagement with the slots 28 and 48 of strips 20 and 30, respectively.

Note that as assembled the faces 27 and 47 of grid strip 20 and 40 respectively are coplanar with each other and with the face 35 of grid strip 30. Faces 23 and 63 of grid strip 20 and 40 respectively are coplanar with each other forming a wall of a cell 57 having an open space 59 between the grid strips.

Each cell 57 has one wall formed from face 34 of the grid strip 30 carrying a spring 32 for contacting the fuel pin. As viewed in FIG. 5, the springs 32 face into the plane of the paper and urge the rods against opposed pairs of dimples 22 on the faces 23, 63 and 27, 47 of the grid strips 20 and 40. This forms a stable five point contact system although it should be appreciated that other contact geometries can also be advantageously employed.

Figure 6A:
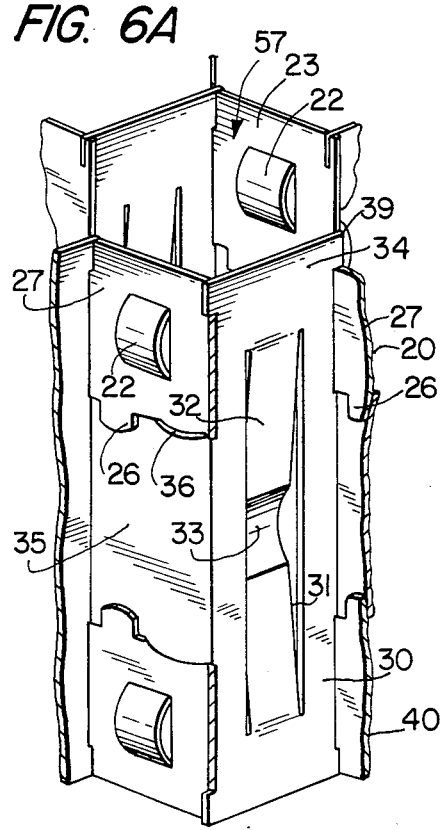
FIGS. 6A and 6B are fragmentary isometric views of a single cell formed by the interlocking grid strips, without a fuel pin present.
Figure 6B:
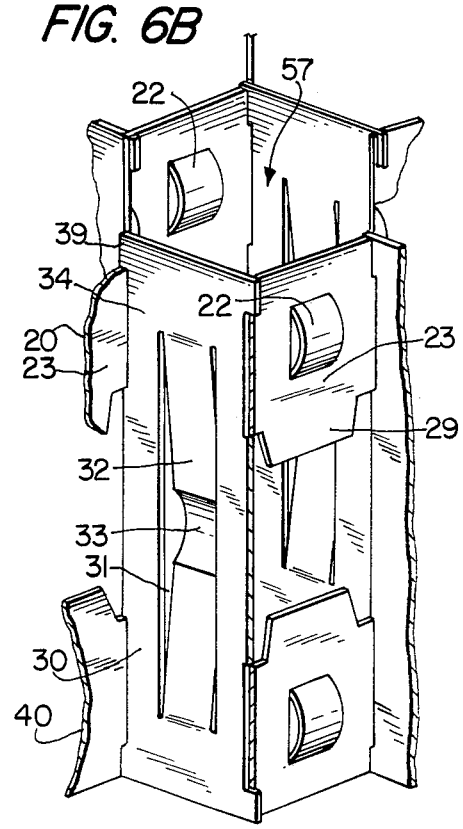

The dimples opposed to the spring 32 in FIG. 5 cannot be viewed in that figure inasmuch as they are obscured by the other elements of the grid assembly. Turning to FIGS. 6A and 6B, however, there is depicted isometric drawings of a single cell of the interlocking grid without any fuel pins. FIG. 6A is a view from the direction of the arrow 6A in FIG. 5. FIG. 6B is a view from the direction of the arrow 6B in FIG. 5. In each view, it can be seen that preferably only a single spring 32 is used to support the fuel pin in each cell and the spring is preferably opposed by a pair of dimples 22 located on alternate adjacent sides of the cell. Thus formed the cell is preferably in the shape of a hexagon with support contact on three of the six sides.

It should be understood that the assembled grid shown in FIG. 4 has only 37 grid cells. A nuclear reactor fuel bundle will typically have several hundred fuel pins in a bundle and this smaller assembly is depicted for illustrative purposes only and shows all the significant geometric features of a full size assembly.

In FIG. 4, the peripheral cells are formed by merely extending the grid strips forming the lattice to the peripheral boundary strip 52. The peripheral grid cells thus formed have a somewhat irregular pentagon shape instead of the regular hexagon shape of the remaining cells. As will be understood by the artisan, as long as the basic nuclear, hydraulic and mechanical design considerations for spacing and supporting the fuel pins are satisfied, the shape of the peripheral cells can be varied to accommodate geometric discontinuities.

The grid strips are preferably attached to the peripheral strip 52 with a spot weld to fix the pieces during assembly but would preferably use a fusion weld as alluded to hereinabove for strength in welding the tabs 54. Processes such as electron beam welding or laser welding may be used for this purpose.

As depicted in FIG. 4, each of the outside cells has a spring formed in the cell wall formed by the peripheral wall 52. Because of this, the peripheral wall should preferably be the same appropriate height, thickness and material as a grid strip 30. Of course, other geometries where the peripheral wall does not support a spring are within the scope of the present invention.

As a further consequence of the peripheral spring placement discussed above, some of the grid strips 20 and 40 should incorporate dimples 22 projecting in both directions from the strip face instead of only one. As will be understood by the artisan, this can be easily accomplished and accommodated in the basic stamped out grid strip design.

The use of interlocking strips to form a tight hexagonal fuel pin array as described above significantly enhances manufacturing ease and reduces the costs of production over prior art grid assemblies, particularly LWBR grid assemblies which used many small face pieces. Moreover, the use of pins at the vertices of the grid strip is avoided with the above described interlocking grid design thus simplifying the grid manufacture and enhancing its reliability. It will be apparent to the artisan that the grid assembly described avoids the use of double thickness of metal along any faces of the grid cell (except for the small locations on strip 30 where tabs 26 overlap S-shaped slot 36) thereby introducing a minimum of parasitic neutron absorbing materials and permitting the nuclear fuel pins to be more closely spaced.

It is also important to appreciate that the interlocking grid design described above will retain its structural integrity without spot welds at the grid vertices, or if such weld are included, for additional safety margin, their failure will not adversely affect the integrity of the grid assembly. In fact, it is only along the peripheral grid strip that welds may be necessary. Moreover, because of the controlled flexure nature of the assembled grid strips and the fuel pin contact geometry, the grid assembly described herein will support the fuel pin lattice fairly rigidly against distortion.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A spacer grid assembly for supporting a plurality of nuclear fuel pins in a closely-spaced array, comprising:
    (a) a first grid strip comprising a plurality of segments, disposed at an angle to each other with alternate segments being substantially parallel to each other, each of said segments carrying at least one dimple for contacting said fuel pins;
    (b) a second grid strip comprising a plurality of segments disposed at an angle to each other with alternate segments being substantially parallel to each other, each alternate segment of said second strip carrying a resilient contact for contacting said fuel pins;
    (c) a third grid strip comprising a plurality of segments disposed at an angle to each other with alternate segments being substantially parallel to each other, each of said segments of said third strip carrying at least one dimple for contacting said fuel pins; and
    (d) interlocking means formed on said grid strips for interlocking said first and third grid strips with said second grid strip to form an array of grid cells having a hexagonal cross section and said segments of said first and third grid strips are substantially coplanar, and wherein said interlocking means includes first tabs positioned on alternate segments of said first and third grid strips for interlocking with first slots formed on other alternate segments of said second grid strips that do not carry said resilient contacts.

2. The spacer grid assembly of claim 1, wherein said first slots comprise S-shaped bends formed along edges of said other alternate segments.

3. The spacer grid assembly of claim 1, wherein said interlocking means further includes second slots formed at a vertex of said angles of said first and third strips and wherein each of said alternate segments of said second strip carries second tabs for interlocking with said second slots.

4. The spacer grid assembly of claim 3, wherein said peripheral boundary strip, together with said grid strip, forms a series of peripheral grid cells, at least some of which are pentagonal.

5. The spacer grid assembly of claim 3, in which said peripheral boundary strip comprises third slots and said grid strips terminate in third tabs, wherein said third tabs are positioned in said third slots.

6. The spacer grid assembly of claim 5, wherein segments of said second strip means carrying said resilient contacts substantially form a wall of a grid cell.

7. The spacer grid assembly of claim 5, wherein each cell wall comprises only a single thickness of grid strip material.

8. A spacer grid assembly for supporting a plurality of nuclear fuel pins in a closely-spaced array, comprising:
   (a) a first grid strip comprising a plurality of segments, disposed at an angle to each other with alternate segments being substantially parallel to each other, each of said segments carrying at least one dimple for contacting said fuel pins;
   (b) a second grid strip comprising a plurality of segments disposed at an angle to each other with alternate segments being substantially parallel to each other, each alternate segment of said second strip carrying a resilient contact for contacting said fuel pins;
   (c) a third grid strip comprising a plurality of segments disposed at an angle to each other with alternate segments being substantially parallel to each other, each of said segments of said third strip carrying at least one dimple for contacting said fuel pins; and
   (d) interlocking means formed on said grid strips for interlocking said first and third grid strips with said second grid strip to form an array of grid cells having a hexagonal cross section and said segments of said first and third grid strips are substantially coplanar, and wherein said interlocking means further includes second slots formed at a vertex of said angles of said first and third strips and wherein each of said alternate segments of said second strip carries second tabs for interlocking with said second slots.

9. The spacer grid assembly of claim 8 further including a peripheral boundary strip at which said grid strips terminate.

10. A spacer grid assembly for supporting a plurality of nuclear fuel pins in a closely-spaced array, comprising:
   (a) a first grid strip comprising a plurality of segments, disposed at an angle to each other with alternate segments being substantially parallel to each other, each of said segments carrying at least one dimple for contacting said fuel pins;
   (b) a second grid strip comprising a plurality of segments disposed at an angle to each other with alternate segments being substantially parallel to each other, each alternate segment of said second strip carrying a resilient contact for contacting said fuel pins;
   (c) a third grid strip comprising a plurality of segments disposed at an angle to each other with alternate segments being substantially parallel to each other, each of said segments of said third strip carrying at least one dimple for contacting said fuel pins; and
   (d) interlocking means formed on said grid strips for interlocking said first and third grid strips with said second grid strip to form an array of hexagonal grid cells, said interlocking means includes first tabs positioned on alternate segments of said first and third grid strips for interlocking with first slots formed on other alternate segments of said second grid strips that do not carry said resilient contacts, said interlocking means further includes second slots formed at a vertex of said angles of said first and third grid strips and wherein each of said alternate segments of said second strip carries second tabs for interlocking with said second slots, and wherein the alternate segments of the first and third grid strips, when assembled, are coplanar with each other and form at least a portion of a wall of a grid cell.

11. A spacer grid assembly for supporting a plurality of nuclear fuel pins in a closely-spaced array, comprising:
   an elongated first grid strip comprising a plurality of segments in which the adjacent segments are arranged at obtuse angles with each other, said first grid strip having a first longitudinal edge and a second longitudinal edge;
   an elongated second grid strip comprising a plurality of segments in which the adjacent segments are arranged at obtuse angles with each other, said second grid strip having a first longitudinal edge and a second longitudinal edge, a plurality or spaced first flanges extending from said first longitudinal edge and a plurality of spaced second flanges extending from said second longitudinal edge;
   an elongated third grid strip comprising a plurality of segments in which the adjacent segments are arranged at obtuse angles with each other, said third grid strip having a first longitudinal edge and a second longitudinal edge; and
   interlocking means formed on said grid strips for interlocking said first and third grid strips with said second grid strip to form an array of grid cells having hexagonal cross sections so that said first and third grid strips are coplanar and so that portions of said second longitudinal edge of said first grid strip abut portions of said first longitudinal edge of said second grid strip, and portions of said first longitudinal edge of said third grid strip abut portions of said second longitudinal edge of said second grid strip.

12. The spacer grid assembly of claim 11, wherein said first and second flanges extend in opposite directions and said interlocking means further includes tabs formed on said first and second flanges of said second grid strip and slots formed in said first and third strips, said tabs engage said slots when said first, second, and third grid strips are interlocked.

* * * * *